United States Patent [19]

Pylat, Jr.

[11] 4,399,653
[45] Aug. 23, 1983

[54] AUTOMATIC ADJUSTING DECELERATION CONTROL FOR A HYDROSTATICALLY POWERED DEVICE

[76] Inventor: John A. Pylat, Jr., 2378 Topaz Dr., Troy, Mich. 48098

[21] Appl. No.: 130,561

[22] Filed: Mar. 14, 1980

[51] Int. Cl.³ .............................................. F15B 9/04
[52] U.S. Cl. ...................................... 60/327; 60/368; 60/446; 60/391
[58] Field of Search ............... 60/388, 390, 391, 368, 60/327, 395, 446, 445, 444, 443

[56] References Cited

U.S. PATENT DOCUMENTS

| | | | |
|---|---|---|---|
| 2,864,239 | 12/1958 | Taylor | 60/391 X |
| 3,609,971 | 10/1971 | Maurer | 60/390 |
| 3,738,110 | 6/1973 | Grosseau | 60/368 |
| 3,748,857 | 7/1973 | Heiser | 60/388 |
| 3,754,400 | 8/1973 | Parquet | 60/445 |
| 3,839,865 | 10/1974 | Chardonneau | 60/446 X |
| 3,935,707 | 2/1976 | Murphy et al. | 60/444 |
| 3,943,712 | 3/1976 | Stuhr | 60/445 X |
| 3,943,716 | 3/1976 | Andersson | 60/444 |
| 3,959,967 | 6/1976 | Chardonneau et al. | 60/382 |
| 4,080,850 | 3/1978 | Bubula et al. | 60/389 X |
| 4,094,229 | 6/1978 | Leonard | 60/445 |
| 4,114,375 | 9/1978 | Saruwatari | 60/372 |
| 4,139,987 | 2/1979 | Budzich | 60/445 |
| 4,152,896 | 5/1979 | Tohma et al. | 60/445 |
| 4,158,290 | 6/1979 | Cornell | 60/445 |

OTHER PUBLICATIONS

Machine Design, "Power Alternators & Shock Absorbers", pp. 165-170, Sep. 28, 1978.

*Primary Examiner*—Gerald A. Michalsky
*Attorney, Agent, or Firm*—Woodard, Weikart, Emhardt & Naughton

[57] ABSTRACT

A hydrostatic drive with an automatic adjusting deceleration control device and method for accomplishing the same. The drive includes a prime mover, a variable displacement hydraulic pump, a hydraulic actuator for driving a load through an operating cycle of acceleration, travel, deceleration, and travel, and a control system for regulating drive operation. Sensing devices are used to sense absolute load position at the point the pump reaches minimum displacement following deceleration. This sensed value is then compared by the control system with the theoretical load position within the operating cycle at the point deceleration should be complete, and corrections are made for variations therefrom by advancing or retarding the point at which deceleration is initiated in the operating cycle.

18 Claims, 12 Drawing Figures

AUTOMATIC ADJUSTING DECELERATION CONTROL FOR A HYDROSTATICALLY POWERED DEVICE

BACKGROUND OF THE INVENTION

This invention relates generally to hydrostatic drives, and in particular to a new type of electrical control for operating mechanical equipment powered by hydrostatic drive. The control compensates for normal drive and equipment performance variations caused by changes in temperature, lubrication, load, wear, or other miscellaneous factors.

A basic hydrostatic drive, or transmission as it is also known, contains a driving means and all controls required for performing work on a load in one simple package. It provides all the advantages of a conventional hydraulic system, such as stepless adjustment of speed, torque and power, accompanied by smooth and controllable acceleration, the ability to be stalled without damage to the drive, and easy controllability, all within the convenience of a single package procurement and installation.

Early hydrostatic drives were intended primarily for low-cost applications such as farm equipment and garden tractors. Improvements in design, and with control systems in particular, have greatly enlarged the potential applications for such drives in recent years. Accordingly, hydrostatic drives are not used in power-shift transmissions, machine-tool drives, winch drives, concrete mixers and pipe tensioners. They are finding ever-increasing applications in the material handling area with automation of devices such as D-stackers, loaders and unloaders, stampers, elevators, and conveyors. Recent interest in such drives has even been shown for military tank transmissions and possibly for automotive applications.

As previously stated, part of the reason for the increasing attractiveness of hydrostatic drives is improvements in design of hydraulic components as well as control systems. This increased attention to hydrostatic drives is due in part to their great versatility. For example, output performance of these drives can be changed through the provision of either constant or variable output power and torque. Their components may be arrayed in a number of different circuits, including an open circuit used for only one direction rotation, an integral circuit used when all components are contained in a single housing, and a split circuit used when most of the components are separate from the pump housing. In design or selection of a suitable drive for a particular use, applicable considerations include the desired speed regulation of the drive, its variation ratio, its starting torque and accompanying ratio, its service factor, and its jogging and threading capacity.

Improvements in controls have also helped to broaden the field in which hydrostatics are applied. For example, pressure compensators are now available to reduce heat generation, eliminate the necessity for cross-port relief valves and simplify other control circuits. Some load-sensing controls are available with overrides to adjust pump displacements. Brake and bypass circuits to eliminate mechanical braking, power limiters to eliminate prime-mover stalling, and speed controls to eliminate output speed variations have also been developed.

The typical operating cycle for a hydrostatically powered device is characterized as involving discrete portions, or stages, of acceleration followed by travel and then deceleration followed by travel. At that point, the cycle may stop or it may reverse or repeat, depending upon the particular hydrostatic device and application being considered. Of particular significance in this operating cycle, is the travel interval following load deceleration. This interval needs to be controlled for at least three reasons: The interval must be adequate to allow the load to stablize after the shock of deceleration. The interval must be adequate to allow for deviation from the ideal or expected movement of the load which may result from mechanical play, reduced pump or motor efficiency at low volume, system leakage, or the like. The interval must be minimized in order to maintain low equipment cycle times as traveling at low speed consumes significant amounts of potential productive time.

Typical drive controls in use today, whether sensing pressure, speed, brake and bypass, power or load variations, assume that the absolute, or actual, motion of the load follows an ideal and expected movement, as more fully described and depicted in the specification to follow. However, numerous thermal and mechanical changes in temperature, lubrication, load, wear and other miscellaneous factors cause variation from this ideal movement which affects normal drive and equipment performance. Of particular significance are changes affecting the deceleration cycle, since the resulting deviations directly affect movement of the load at the critical time of its final travel interval when it is moving at low speed, and may be about to perform some critical function such as gaining control of, releasing, or positioning some part in a productive process. Notwithstanding this fact, applicant is aware of no prior disclosure, patented or otherwise, that addresses this problem and suggests a means for compensating or correcting for it.

SUMMARY OF THE INVENTION

One aspect of the present invention comprises a hydrostatically powered drive and adjusting deceleration control device for compensating for normal drive and equipment performance variations caused by thermal or mechanical changes such as those mentioned above. The device includes a drive means for driving a load through an operating cycle of acceleration, travel, deceleration and travel, and a control means for regulating the same. This control means includes means for determining whether the drive and load reach minimum speed coincident with the load first reaching the position where the load should be at minimum speed, and then for correcting sensed variations therebetween by adjusting the point at which deceleration is initiated in the operating cycle.

A second aspect of the invention comprises a method for controlling the operation of a hydrostatically powered device as embodied in applicant's drive and adjusting control, both of which are described and depicted in detail in the specification to follow and in the claims attached hereto.

Related objects and advantages of the present invention will be apparent from the following description.

DESCRIPTION OF THE PREFERRED EMBODIMENT

Before addressing the preferred aspects of applicant's invention, it is believed beneficial to first consider the arrangement and operation of a typical hydrostatic drive. With this in mind, FIG. 1 depicts a closed-loop hydrostatic drive 10 characteristic of those drives now used in industry.

Defined broadly, drive 10 includes a drive means 11 for performing work on a load and a control means 12 for regulating the drive operation. Drive means 11 contains an electric motor or other prime mover 13 which operates at a relatively constant speed to power a variable displacement hydraulic pump 14. Pump 14 in turn powers a hydraulic actuator 15 through a directional valve 16. This actuator means 15 may be an equal displacement cylinder, hydraulic motor, rotary actuator, or any other hydraulic device capable of performing work on a load to drive the same through a normal operating cycle of acceleration, travel, deceleration, and travel. Examples of typical uses of these drives have been previously mentioned.

Control means 12, for regulating operation of drive means 11, includes first a sensing means 18 which creates electrical signals at significant events in the normal operational cycle of the load. This means 18 may consist of a variety of devices such as mechanically actuated limit switches, photoelectric sensors, metallic proximity sensors, cam limit switches, optical encoders, phase shift encoders, or resistance encoders. It may sense pressure or speed variation, or certain load positions within the operating cycle, as further discussed below. Regardless of the particular device 18 used, it provides electrical information to the equipment control means 21 enabling it to make logical decisions to control starting and stopping of the load or some auxiliary function such as opening and closing a mechanical hand or raising and lowering a portion of the device in use. Two types of signals affecting drive operation are typically created by this equipment control means 21. The first type 22 controls operation of the drive directional valve 16. The second type 23 controls the output of hydraulic pump 14.

Figure 1:
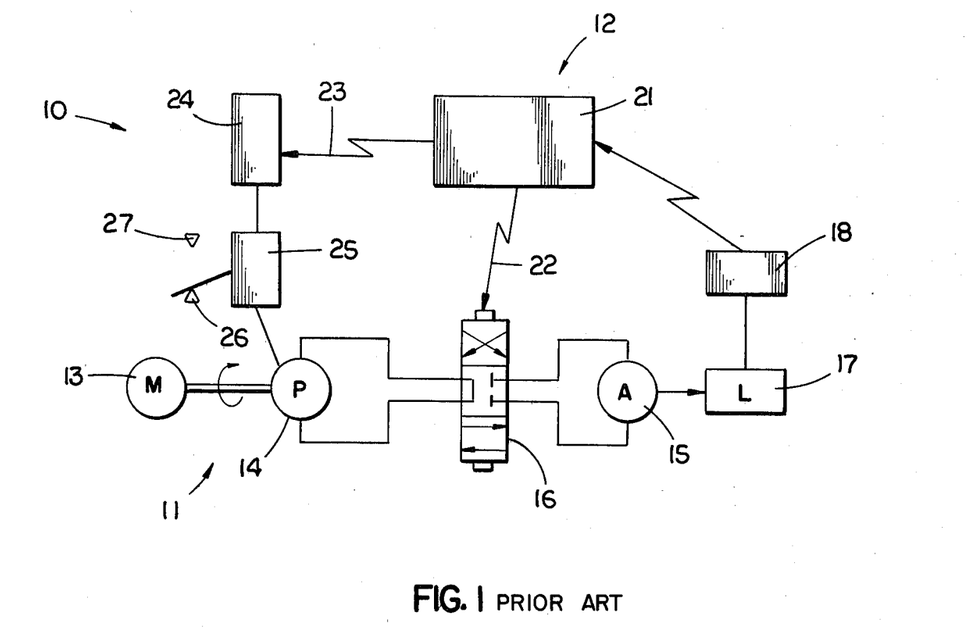
FIG. 1 is a simplified schematic diagram of a typical hydrostatic drive system.

For example, pump output at any given time is determined by four items in FIG. 1. The pump acceleration/deceleration control 24 typically receives electrical signals 23 from equipment control means 21 which cause it to initiate a change in pump output between minimum and maximum displacement. This change in pump output creates corresponding changes in the absolute, i.e., actual, speed of load 17.

In a typical drive 10, this acceleration/deceleration control 24 may comprise a simple valve and cylinder arrangement external to pump 14, or it may be a complicated servo arrangement operating on internal servo pistons located within the pump housing. Various types of acceleration/deceleration controls are available to generate linear, harmonic and other types of characteristic signals. In any case, the acceleration/deceleration control 24 causes a pump displacement control 25 to move between a minimum displacement stop 26 and a maximum displacement stop 27, all of which may be internal or external to the pump. For example, in some servo valve-controlled systems, the minimum and maximum displacement positions are determined electronically, thus eliminating the need for mechanical stops. Regardless of what mechanism is used, however, controlling the variable displacement, i.e., output, of pump 14 completes the closed-loop hydrostatic drive 10 which is typical of those in use today.

Figure 3:
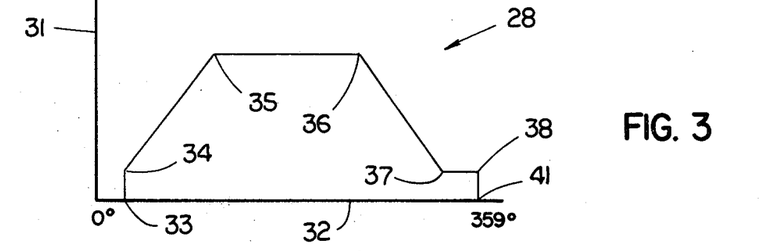
FIG. 3 is a graph illustrating the ideal or expected operating cycle of a typical hydrostatic drive.

FIG. 3 illustrates the typical, or ideal, operating cycle 28 of a hydrostatically powered device such as drive 10 in FIG. 1. Pump displacement or load speed is plotted on vertical axis 31. Position of the load within the operating cycle is plotted on horizontal axis 32. In this case, the horizontal units representing load position are expressed as degrees of the operating cycle. This choice is purely discretionary, as any unit of measure may be used.

The ideal operating cycle 28 begins at reference point 33 somewhat more than zero degrees. At that point, load speed is zero and direction valve 16 of the drive is closed. When equipment control means 21 begins the cycle, directional valve 16 shifts and hydraulic output from pump 14 through actuator means 15 increases the speed of load 17 to a minimum speed setting 34 corresponding to the minimum displacement stop 26 in FIG. 1. As hydraulic output continues to increase, the acceleration portion of the cycle is underway. Acceleration is complete at reference point 35 where pump displacement control 25 is now at maximum displacement stop 27 corresponding to load 17 being at maximum speed. Load 17 travels at maximum speed between reference points 35 and 36. At point 36, sensing means 18 signals equipment control means 21 that load 17 is at the point in the operating cycle where deceleration should begin. Equipment control means 21 signals acceleration/deceleration control 24 to start deceleration by decreasing output displacement from pump 14. In the interval between reference points 36 and 37, pump displacement control 25 moves from maximum displacement stop 27 to minimum displacement stop 26 corresponding to load speed decreasing to its minimum setting. At point 37, drive 10 is once again at minimum output. Drive 10 and load 17 travel at minimum speed from point 37 to point 38 in the cycle where the signal from sensing means 18 causes equipment control means 21 to shift directional valve 16 to closed thereby stopping the load at a predetermined point 41.

In FIG. 3, this point 41 is shown as somewhat less than 359 degrees into the operating cycle. This point may vary, as some types of equipment may be required to operate between zero degrees and 359 degrees exactly. Regardless of its location, however, the significance of point 41 is keyed to the particular hydrostatic drive under consideration. For example, the cycle may end or be automatically repeated at point 41, or it may reverse thereby moving from 359 degrees back to zero degrees. Nevertheless, as illustrated in FIG. 3 hydrostatic drive devices are typically operated to accelerate, travel, decelerate and travel with either a stop, reverse cycle, or repeat cycle then to follow.

As previously mentioned, particular significance in this cycle 28 is accorded by applicant to the interval between reference points 37 and 38 during which load 17 is traveling at minimum speed. This interval must be sufficiently long to permit the load to stabilize after the shock of deceleration and to compensate for deviations from the ideal movement depicted in FIG. 3, which may result from mechanical play, reduced pump and motor efficiency at low volume, system leakage, and other causes. In addition, this final travel interval must be minimize to maintain low equipment cycle times because traveling at low speed consumes significant amounts of potential productive time. Four types of variation in the deceleration portion of the cycle are of particular significance in regard to this final travel interval.

Figure 4:
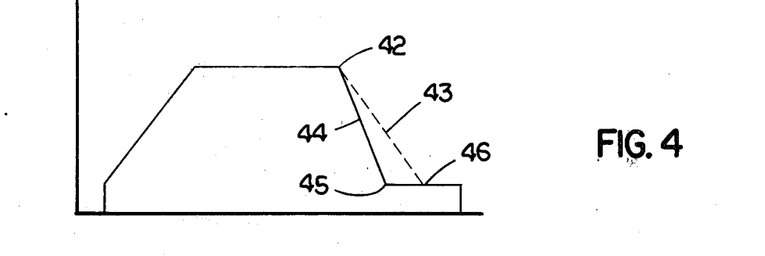
FIG. 4 is a graph similar to FIG. 3, but illustrating the effect of increased rate of load deceleration on the ideal cycle.

First, an increase in the rate of deceleration has the effect illustrated in FIG. 4. In particular, the drive and load start, accelerate and travel at maximum speed to the correct point 42 in the cycle where deceleration is to begin, all consistent with the ideal operating cycle depicted in FIG. 3. At that point, equipment control means 21 signals acceleration/deceleration control 24 to begin deceleration. Instead of decelerating at the ideal or expected rate shown by broken line 43, the drive and load decelerate at a high rate indicative of line 44. This results in the drive and load reaching minimum speed at point 45 rather point 46. The extra interval at minimum speed between points 45 and 46 represents an undesirable consumption of cycle time in excess of optimum or ideal. Productive time is lost.

Figure 5:
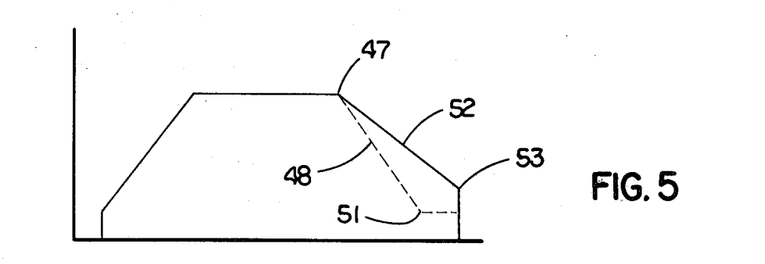
FIG. 5 is a graph similar to FIG. 3, but illustrating the effect of decreased rate of load deceleration on the ideal cycle.

FIG. 5 illustrates a second variation in which a decrease in the rate of deceleration is encountered. Once again, the drive and load start, accelerate, travel at maximum speed, and then begin decelerating at point 47, all per the ideal operating cycle in FIG. 3. Instead of decelerating at the planned rate shown by broken line 48, reaching minimum speed at point 51 in the cycle, the drive and load decelerate at a lower rate as shown by line 52. When the drive and load reach stopping point 53, directional valve 16 is closed even though the pump has not reached minimum displacement and the load is still traveling faster than it should be. The resulting shock in the hydraulic and mechanical systems of the drive may cause premature equipment failure, mislocation of the load when it finally comes to rest, or other undesirable results.

Figure 6:
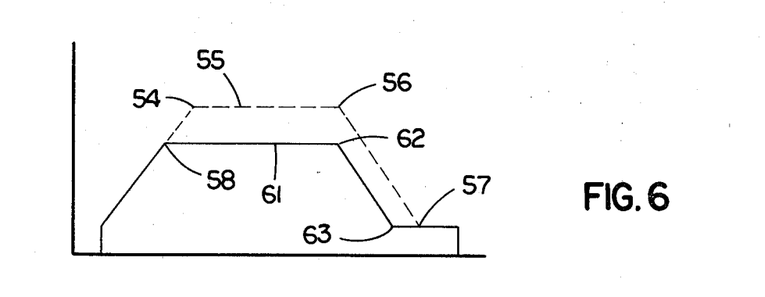
FIG. 6 is a graph similar to FIG. 3, but illustrating the effect of decreased maximum load speed on the ideal cycle.

A third variation is a decrease in the maximum speed attained by the load, as illustrated in FIG. 6. This deviation has virtually the same effect as an increase in the rate of deceleration depicted in FIG. 4. For example, the drive and load start and accelerate properly but do not reach the planned velocity at point 54 or follow the ideal operating cycle illustrated by broken line 55 through points 56 and 57. Instead, the drive and load reach a lower maximum speed at point 58 and follow solid line 61 possibly decelerating at the correct point 62 but reaching minimum speed too early at point 63. The additional travel interval between points 63 and 57 decreases average speed of the load through the complete cycle and represents lost productive time.

Figure 7:
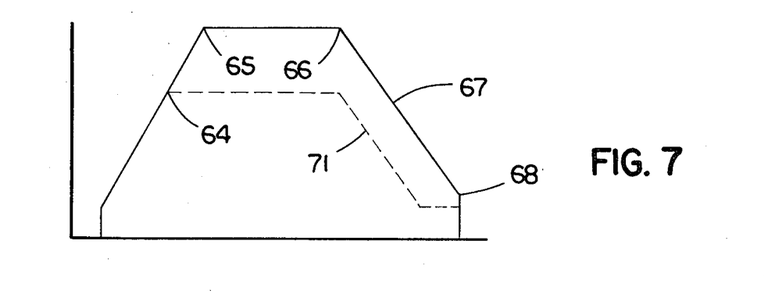
FIG. 7 is a graph similar to FIG. 3, but illustrating the effect of increased maximum load speed on the ideal cycle.

A fourth variation depicted in FIG. 7 represents an increase in the maximum speed attained by the load, which has virtually the same effect as a decrease in the rate of deceleration depicted in FIG. 5. In this example, the drive and load start and accelerate at the proper rate, but accelerate beyond ideal speed 64 to a new maximum speed 65. Even assuming the drive and load start a normal deceleration at the proper point 66 and at the correct rate shown by line 67, the drive and load will reach stopping point 68 before attaining minimum speed as should occur if broken line 71 had been followed. Once again, tremendous shock is created when the direction valve closes and the drive and load are suddenly stopped.

These four possible deviations from an ideal operating cycle are by no means exclusive. They are only simplified representations of some isolated variations that can result from thermal and mechanical changes in temperature, lubrication, load, wear and other factors. Their significance is in pointing out that regardless of the variation or variations that are encountered, they will affect, and can be detected in, this crucial final travel interval in the operating cycle after deceleration has occurred. Applicant is not aware of any prior hydrostatic drive or control that has recognized or addressed this problem, or has recommended a means for sensing and for correcting it. Applicant's present invention does just that.

Figure 2:
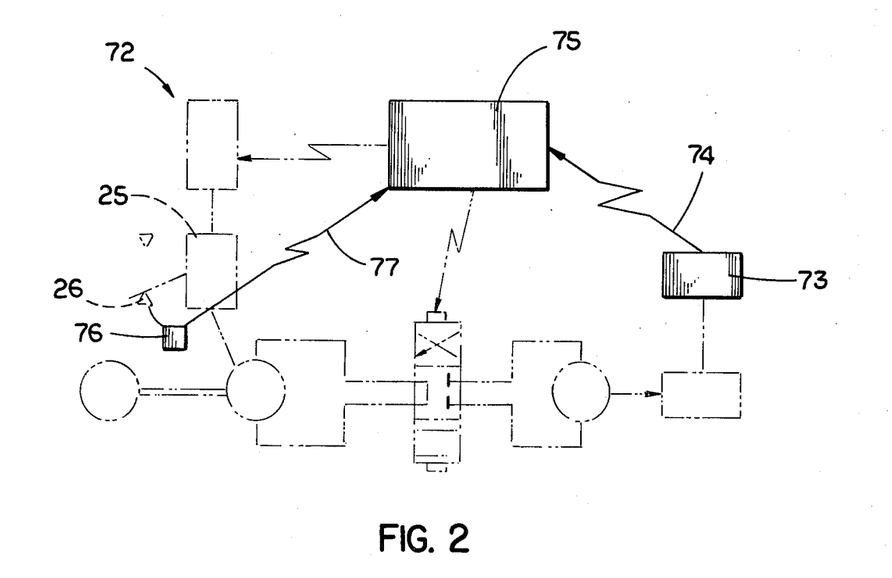
FIG. 2 is a schematic diagram similar to FIG. 1, except highlighting the significant components of the preferred embodiment of applicant's automatic adjusting deceleration control.

Referring now to FIG. 2, therein is depicted a schematic diagram of the hydrostatic drive device 72 comprising one preferred embodiment of applicant's present invention. The broken lines in the figure represent the components of preferred drive 72 that are identical with those found in a typical drive 10 as depicted in FIG. 1 and described above. The solid, or unbroken, lines in FIG. 2 highlight the major areas of improvement with applicant's preferred drive 72.

In particular, sensing means 73 senses load position rather than pressure, velocity, power, or any other variable common to standard drive controls. It must be capable of producing numerically interpretable electrical signals corresponding to the absolute position of load 17 at least at certain discrete points within the normal operating cycle. Sensing means 73 may be any one of a number of commercially available sensors which produce such signals, such as C & A PCE 1000, Theta Instruments T0360-A-1, Trump Ross LRB-360-SSDO-2A, and Astro Systems FE 2001/FF3001. A LITTON 76 Series Optical Encoder is preferred. These signals 74 are transmitted to the preferred equipment control means 75. Means 75 must include a programmable controller, or a dedicated electronic device capable of interpreting the electrical signals, comparing the representations of absolute load position with numerically defined significant positions preselected for the ideal or needed operating cycle, and then furnishing logical signals to the balance of the preferred equipment control means, which may be either conventional relay or solid state logic. Means 75 must be further capable of performing addition, subtraction and reference table operations with the numerically defined and sensed signals. Examples of suitable control systems are a MODICON 384 Programmable Controller, an ALLEN BRADLEY PLC Programmable Controller or a Digital Equipment Corporation PDP8 or PDP11 Minicomputer Controller. A MODICON 484 Programmable Controller is preferred based on work done by applicant to date.

A minimum pump displacement sensing means 76 is then operably connected to the minimum displacement stop 26 of pump 14 for relaying an electrical signal 77 to preferred equipment control means 75 whenever the pump displacement control 25 is at the minimum displacement stop. This sensing means 76 is not found in typical hydrostatic drives. Moreover, to applicant's knowledge, no one has before provided a means or device for the specific purpose of sensing when the drive itself reaches low speed. This means 76 may be a mechanical limit switch, simple electrical contact, photoelectric sensor, or any other device which will supply the needed electrical signal. A MICRO BZE6-02RN7 7907 Switch is preferred. In those cases where a servo acceleration/deceleration and speed-control device 24 is used, an electronic comparator of some type would be necessary for use as sensing means 76.

The purpose of these special components in applicant's preferred hydrostatic drive, and the corresponding improvement in applicant's preferred control means, is the provision of means for determining whether the deceleration portion of the equipment cycle is completed at the proper point in the operating cycle in relation to theoretical load position, and then to correct for deviation by adjusting the drive control cycle to advance or retard the point at which the deceleration portion of the operating cycle is initiated. A significant fact to consider is whether a noted deviation is due to variation in maximum speed, or due to variation in rate of deceleration, or due to a combination of both or to some other cause, the end result is the same. That result is that the drive and load do not reach minimum speed coincident with the load reaching the position where the load should be at minimum speed according to the ideal operating cycle.

To first sense any deviation, applicant's preferred device 72 provides means 73 and 76 for sensing absolute load position at the point the pump reaches minimum displacement following deceleration in the operating cycle. This information is then relayed to the equipment control means 75 which compares absolute load position at that point with values representing theoretical load position at the end of drive and load deceleration within the ideal operating cycle as illustrated in FIG. 3. These preselected, or theoretical, values may be preprogrammed into control means 75 or could be derived from manual switch settings on the control panel (not shown) of the drive to thereby give operators the ability to make necessary adjustments with variations in job selection or the like.

Applicant's preferred control means 75 then corrects for detected improper load position by moving the point at which deceleration is initiated in the operating cycle. When deceleration must begin earlier in the machine cycle, as with the circumstances depicted in FIGS. 5 and 7, control means 75 subtracts a calculated or tabulated correction factor derived from the amount of time required by the drive and load to reach minimum speed after the load passes the point at which the load should have reached minimum speed. Control means 75 causes deceleration to begin later in the operating cycle by adding a correction factor to the deceleration point in cases such as those depicted in FIGS. 4 and 6. This correction factor is derived generally by subtracting the point where minimum speed is first achieved from the position of the load where minimum speed should be reached.

In any case, there are a number of ways within the experience and knowledge of those skilled in the art for arriving at the needed correction factors given applicant's invention. For example, it could be done with a time base or distance base using known procedures and information. At the present, applicant prefers a combined distance base and table lookup routine type correction procedure which is illustrated in the system flow chart in FIG. 8, although a somewhat more complicated calculated self-learning type procedure may work equally well. The mechanism disclosed therein, and described in detail below, interprets the performance of the drive and load during operation, and then automatically changes the point at which deceleration is initiated in the next cycle to correct for improper travel intervals following deceleration.

Figure 8A:
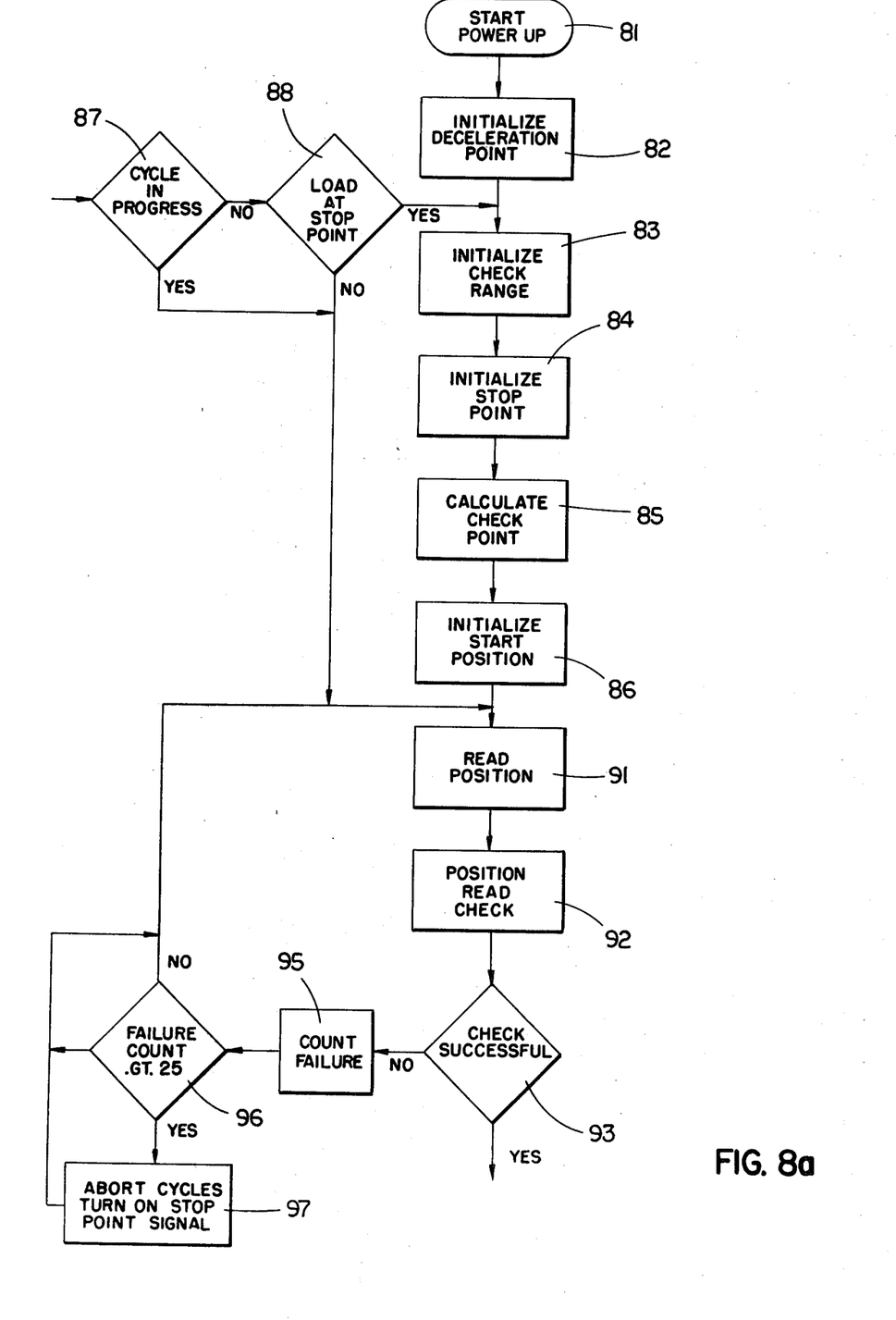
FIGS. 8a–8e is a system flow chart in block form illustrating the mechanism or logic by which the intelligent portion of applicant's preferred equipment control system can interpret the performance of the drive load, and by which it then changes the point at which deceleration is initiated.

In particular, the preferred method and operation of applicant's preferred hydrostatic drive 72 begins with turning on the power to the drive itself as represented by step, or box, 81. Control means 75 establishes an initial deceleration point for the operating cycle in step 82. This point can be programmed into the control means, or read from a set of switches on the control panel which are set manually. Control means 75 then establishes a check range value in step 83 corresponding to the desired distance traveled by the load 17 between the time that drive displacement control 25 arrives at the minimum displacement stop and the time that load 17 reaches the stop point. This distance corresponds to the final travel interval following deceleration in the operating cycle. Control means 75 establishes the desired stopping point (38 in FIG. 3) in step 84; and the actual checkpoint (37 in FIG. 3) is calculated in step 85 by subtracting the check range from the stopping point position of the previous two steps. This method insures that system operation is not disrupted by inadvertently setting the checkpoint beyond the stop point.

In step 86, control means 75 initializes the starting position using values that are preprogrammed, or are derived from manual switch settings on the control panel of the drive to give operators the ability to make necessary adjustments during operation. It is necessary to restrict point changes to a time when all motion has stopped, and when the automatic adjusting cycle is complete. These restrictions are depicted in steps 87 and 88 in FIG. 8.

Figure 8B:
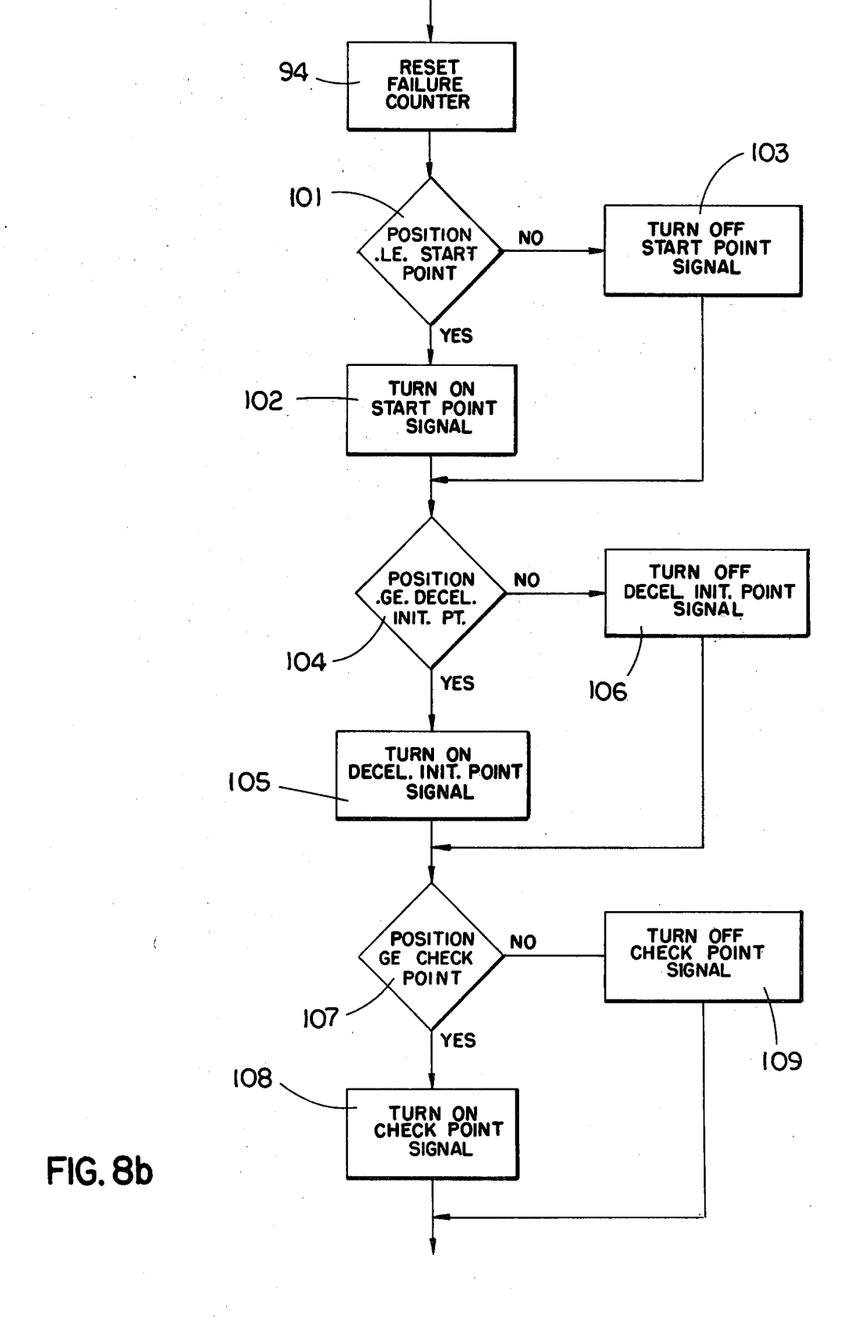

In step 91, control means 75 examines the signal representing load position from sensing means 73 and establishes the current position of the load. A validity check is performed on this position in step 92 by determining whether the position reading is within plus or minus one degree of the previous reading. This is to prevent noise or erroneous readings from triggering the sensitive deceleration adjusting cycle. If readcheck step 92 is successful, the system proceeds through step 93 to step 94 where the failure counter is reset for later use. If a bad value is detected, it is counted in step 95 and if the number of failures counted in sequence exceeds a predetermined number, e.g., 25, in step 96, then a load at stopping point condition is simulated in step 97 and control means 75 attempts another position reading operation in step 91. In the event that the number of failures is less than the preset number, the system just attempts to read again. In step 94, a successful position reading operation clears the failure counter and allows the control system to continue.

In operations represented in steps 101 through 109, the load position is compared to the current values of the starting point, the deceleration point, the checkpoint and the stopping point. When these several tests indicate that the load is at a point or within a specified interval of the operating cycle, a signal is produced which is delivered to the other parts of equipment control means 75. When the tests indicate that the load is not at the specified point or intervals, the corresponding signals are turned off.

Figure 8C:
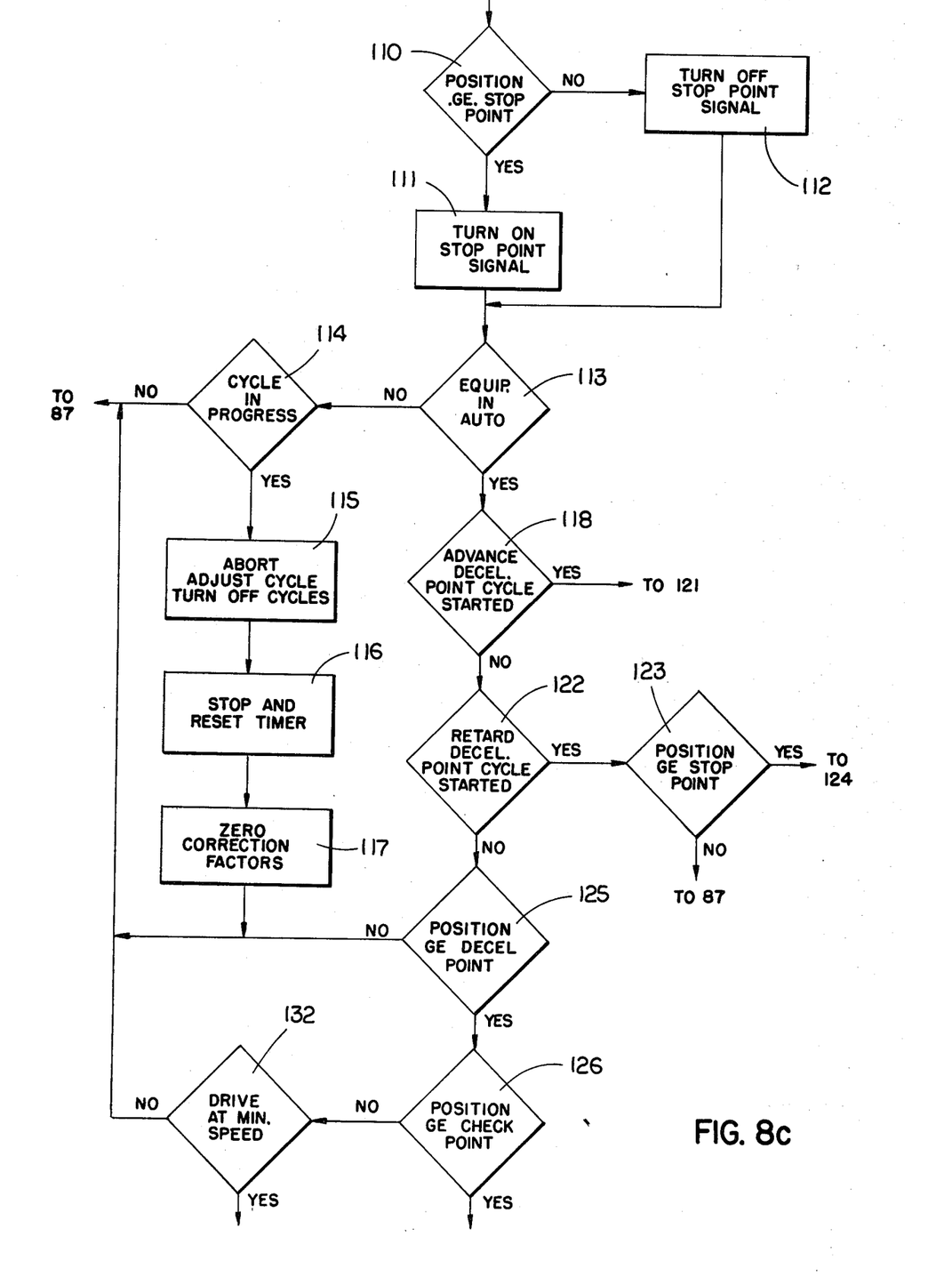

The "outside" portion of the equipment control means 75 must furnish the automatic adjusting portion with a signal indicating that the equipment is operating automatically—that is, that the equipment is functioning normally and it is desirable to automatically adjust the deceleration point. This automatic signal is tested in operation 113. In the event that this signal is absent at any portion of the machine cycle, the automatic adjust cycle is aborted in steps 114 and 115 and control passes back through steps 116 and 117 to the cycle in progress check in step 87 and then on to the position reading operation in step 91. As long as the signal is present, step 113 passes control to the decision operation in step 118.

Step 118 checks to see whether a cycle has been initiated to advance the deceleration point in the operating cycle—that is, to move it toward the stop point to correct, for example, for excessive speed during stopping of the load. If such a cycle has been started, control is passed to step 121 where the cycle is completed. Step 121 will be examined in detail later. In the event that the advance cycle has not been initiated, control is passed to step 122 which performs a similar check to determine if a retard deceleration point cycle has been started to correct for excessive low-speed travel at the end of the operating cycle. In the event that retard cycle has been started, control is passed to step 123 which checks to determine if the load has arrived at the stop point. This condition is necessary to continue the retard cycle. If the load is not at this point, control is transferred back through steps 87 and 88 to the read position operation in step 91. Eventually, control will be returned to step 123 coincident with the load reaching the stop point; and at that time control will be passed to step 124 which performs the correction process—but only after the load is at rest. Returning now to the decision operation in step 122, control will be passed to step 125 in the event that neither of the adjust cycles is in progress.

Figure 8D:
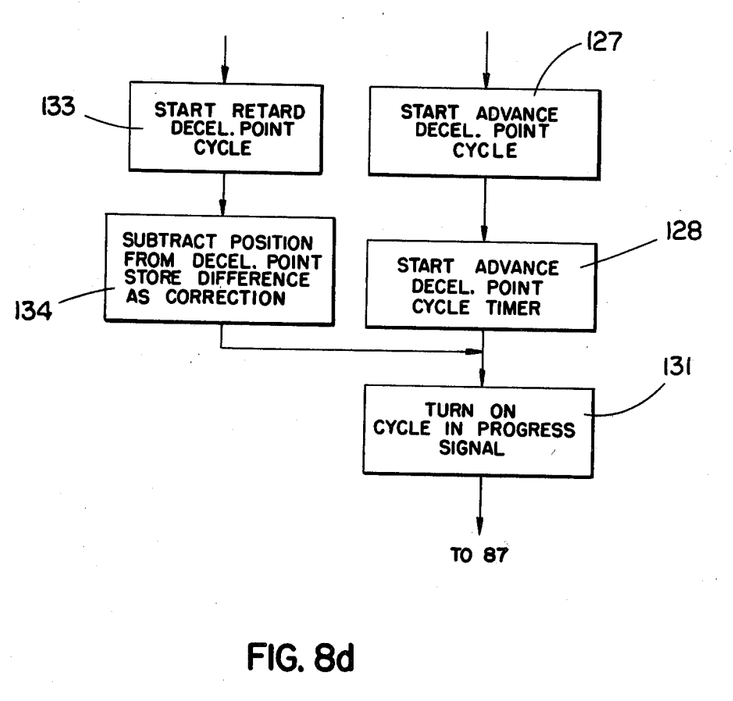

The operations performed in steps 125, 126 and 132 initiate the advance deceleration point and retard deceleration point cycles. In the event that one of the cycles is not initiated, control is passed back through steps 87 and 88 to the read position operation at step 91. If the load is at or past the deceleration point, the decision at step 125 is yes. If the load has reached or passed the checkpoint, i.e., the point at which it should reach minimum speed, as tested in step 126, the system begins the process of advancing the deceleration point at step 127. The first step in the cycle is to start a timer at step 128 which measures the amount of time it takes until the drive actually reaches the minimum speed setting. The next step in the cycle represented by box 131, is to turn on a signal which indicates to the other parts of the control means 75 that an adjust cycle is in progress and that the next automatic operation should wait until the deceleration adjust cycle is complete. Following this step, control of the system transfers back through step 87 to the read position routine in step 91. The advance deceleration point cycle will be complete at a later time when control passes through step 118 already discussed.

In the event that the load is not at or past the checkpoint of step 126, a test is performed in step 132 to determine whether the drive itself is at low speed prematurely. If the displacement control is not at the low speed stop prior to the load passing the checkpoint, operation is normal and control is passed back through steps 87 and 88 to reading the low position in step 91. If, however, the drive is at low speed too soon, control passes to step 133 where the retard deceleration point cycle is initiated. In step 134, the system subtracts the position of the load where the drive reached low speed from the checkpoint, i.e., the position where the drive should have reached low speed under normal operation. The difference represents the correction which must be added to the deceleration point at the end of the cycle to move closer to the checkpoint. At this time, control passes to step 131 which initiates the cycle in progress signal in step 87 explained above. Control then passes to the read position routine 91 eventually to complete the cycle through step 123 to step 124.

Figure 8E:
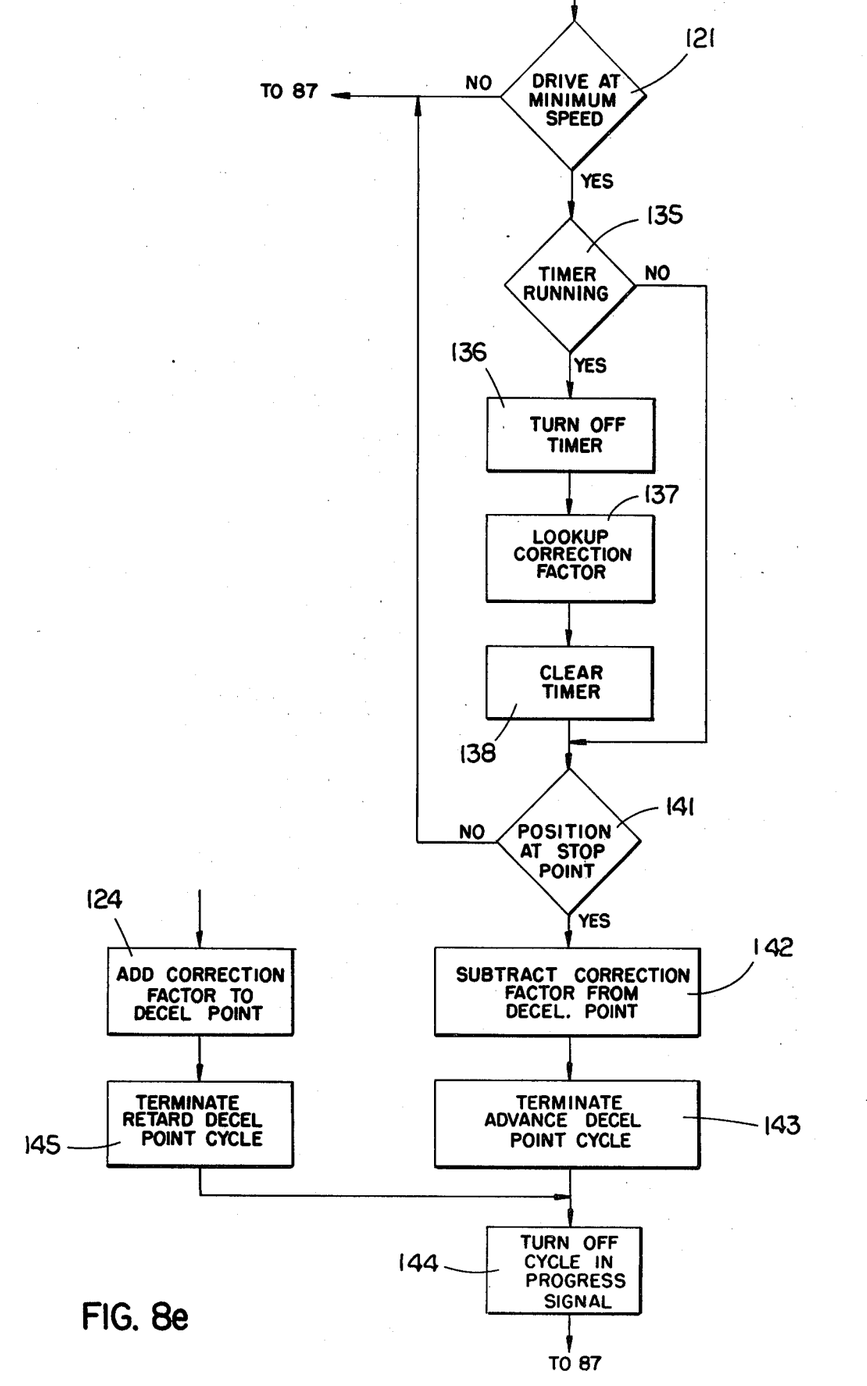

Now, assume that an advance deceleration point cycle has been started. When control is passed to step 118, it in turn passes control to the examining step 121 which tests to determine if the drive has as yet reached low speed. This, as before, is a necessary condition for completing the adjusting cycle. In the event that low speed has not been reached, control is returned through step 87 to the read position routine in step 91. When the drive finally reaches low speed, the system now checks in step 135 to see if the timer started at step 128 is still in operation. If it is not in operation, this signifies that control has already passed through step 135 in the cycle, that it has stopped timer 136, has determined the necessary correction factor in step 137, and has cleared the timer in step 138. If the timer is in operation, control passes individually through steps 136 through 138 to accomplish these operations. In any case, this test in step 135 effectively prevents a repeat trip through the routine a second time in the same cycle which could create a new erroneous correction factor.

Ultimately, the system transfers control to step 141 where the system checks to see if the load is at the stopping point. If not, control is passed through step 87 to the read position routine in step 91. When control is finally returned to step 141, and the load has reached the stopping point, the cycle is completed by subtracting the correction factor from the current deceleration point in operation 142. This subtraction effectively moves the point closer to the checkpoint and later in the machine cycle. After this process, the adjust cycle is terminated and the cycle in progress signal is turned off thereby allowing the equipment to continue its normal operating cycle.

The amount of correction required in step 142 is a function of time. This function is related to many physical variables. Rather than compute a correction function for each device, tabulated values may be programmed into control means 75 which will insure that correction is always adequate. In applicant's preferred device, it is believed advisable to over correct for the load stopping at too high a speed and then to rely upon the more accurate retard deceleration point cycle to bring the deceleration into the correct location.

Now, assuming a retard deceleration point adjust cycle is in progress, control is transferred through step 122 to 123 as discussed above. When the load reaches the stop position, the operation at step 124 adds the correction factor to the deceleration point in a reverse manner to the subtraction operation described above. The cycle then terminates at step 145 and the cycle in progress signal is turned off as before at step 144.

This completes the description of the intelligent or logic portion of applicant's preferred hydrostatic drive 72 and control system 75. As previously mentioned, the flow chart depicted in FIG. 8 represents only one possible base or program suitable for use with the preferred drive 72 described above. Other suitable programs are within the knowledge and experience of those skilled in the art.

The preferred method of applicant's invention is embodied in the above description and operation of applicant's preferred hyrostatic drive and control device. It includes sensing both absolute load position in the operating cycle and minimum pump displacement of the drive itself. After sensing this load position at the point when minimum pump and drive displacement is first reached following deceleration, the preferred method compares the sensed position with the theoretical load position within the operating cycle at the point where deceleration should be complete. The method this includes the step of correcting for variations between the sensed and theoretical positions of the load by advancing or retarding the point at which decleration is initiated in the operating cycle.

The advantages attending applicant's preferred method are similar to those discussed above with regard to his preferred drive and control device. Continuous mechanical sensing and adjusting steps are not required throughout the operating cycle as is true with certain prior art methods and devices. On the contrary, applicant's preferred method concentrates on the key checkpoint at which deceleration is complete (and should be complete) following the deceleration portion of the operating cycle. When deviations from the norm are encountered, one simple adjusting step is performed to retard or advance the point in the cycle at which deceleration of the drive and load is initiated. In this way, applicant's method corrects for deviations caused by any number of equipment performance or environmental variations with only this one simple correcting step. Applicant's method can further be accomplished automatically using the programmable controller and other apparata described in detail above.

In the foregoing paragraphs, applicant's preferred hydrostatic drive and control device and his preferred method have been described and depicted in detail. The same are believed readily distinguishable over the prior art based upon the descriptions above and the advantages obtained therefrom.

I claim:

1. A control device for regulating the operation of a hydrostatic drive, which drive includes a prime mover, a variable displacement pump powered by the prime mover, and a hydraulic actuator means powered by the pump through a directional valve for driving a load through an operating cycle of acceleration, travel, deceleration and travel, said control device comprising:
   (a) means for determining whether the drive and load reach minimum speed coincident with the load reaching the position in the operating cycle where the load should be at minimum speed; and
   (b) means for correcting for variations therebetween by adjusting the point at which deceleration is initiated in the next operating cycle.

2. The control device in claim 1 wherein said means for determining includes:
   (a) means for sensing minimum pump displacement; and
   (b) means for sensing absolute load position within the operating cycle at the point of minimum pump displacement.

3. The control device in claim 2 wherein said means for correcting includes:
   (a) means for comparing the absolute load position sensed by said sensing means with the theoretical load position within the operating cycle at the point deceleration should be complete; and
   (b) means for advancing and retarding the point at which deceleration is initiated in the operating cycle responsive to compared variations between the sensed and theoretical load positions.

4. The control device in claim 3 wherein said means for sensing, comparing, and correcting are automated.

5. The control device in claim 3 wherein said means for correcting includes means for using a variation determined by said comparing means to advance or retard the point in the next operating cycle at which the pump initiates a change to minimum displacement.

6. The control device in claim 2 wherein said means for sensing minimum pump displacement includes an electrical limit switch connected to the minimum displacement stop for the pump, said means for sensing absolute load position includes an optical encoder, said means for correcting includes a programmable controller.

7. The control device in claim 1 wherein said means for correcting involves only adjusting the point at which deceleration is initiated in the next operating cycle.

8. A hydrostatic drive device, comprising:
   (a) a prime mover;
   (b) a positive displacement pump powered by said prime mover;
   (c) hydraulic actuator means, powered by said pump through a directional valve, for driving a load through an operating cycle of acceleration, travel, deceleration and travel; and
   (d) control means for regulating drive operation, said control means includes means for determining whether the drive device and load reach minimum speed coincident with the load reaching the position in the operating cycle where the load should be at minimum speed and for correcting for variations therefrom by adjusting the point at which deceleration is initiated in the next operating cycle.

9. The hydrostatic drive device in claim 8 wherein said means for determining includes means for sensing whether said pump output reaches minimum displacement coincident with load position reaching the point in the operating cycle at which deceleration should be complete.

10. The hydrostatic drive device in claim 8 wherein said means for determining includes:
    (a) means for sensing only minimum pump displacement;
    (b) means for sensing absolute load position within the operating cycle at the point of minimum pump displacement; and (c) means for comparing the absolute load position at minimum pump displacement following deceleration with theoretical load position within the operating cycle at the point deceleration should be complete.

11. The hydrostatic drive device of claim 8 wherein said means for correcting includes means for advancing and retarding the point at which deceleration is initiated in the operating cycle responsive to the compared absolute load position having attained a position less than or greater than the theoretical load position, respectively.

12. The hydrostatic drive device of claim 11 wherein said control means and said means for sensing, comparing and correcting are automated.

13. The hydrostatic drive device of claim 10 wherein said means for correcting includes means for using a variation determined by said comparing means to advance or retard the point in the next operating cycle at which said control means signals said pump to initiate a change to minimum displacement.

14. The hydrostatic drive device of claim 13 additionally comprising a pump acceleration/deceleration control which receives signals from said control means to initiate changes in said pump displacement.

15. The hydrostatic drive device of claim 10 wherein said means for correcting for a determined variation includes only adjusting the point in the next operating cycle at which said control means signals said pump to initiate a change to minimum displacement.

16. A method for controlling the operation of a hydrostatically powered device, which includes a prime mover, a variable displacement hydraulic pump, hydraulic actuator means for driving a load through an operating cycle of acceleration, travel, deceleration and travel, and control means for regulating drive operation, comprising the steps of:
 (a) sensing minimum pump displacement of the device,
 (b) sensing absolute load position in the operating cycle at the point of minimum pump displacement following deceleration;
 (c) comparing the sensed load position with the theoretical load position within the operating cycle at the point deceleration should be complete; and
 (d) correcting for variations between the sensed and theoretical load positions by advancing or retarding the point at which deceleration is initiated in the next operating cycle.

17. The method in claim 16 in which said correcting includes the step of using a variation determined by said comparing to adjust the point in the next operating cycle at which the control means signals the pump to initiate a change to minimum displacement.

18. The method in claim 16 in which said correcting only includes the step of using a variation determined by said comparing to adjust the point in the next operating cycle at which the control means signals the pump to initiate a change to minimum displacement.

* * * * *